US007206302B2

(12) United States Patent
Voyer et al.

(10) Patent No.: US 7,206,302 B2
(45) Date of Patent: Apr. 17, 2007

(54) MOBILE RADIO COMMUNICATION SYSTEM, COMMUNICATION APPARATUS APPLIED IN A MOBILE RADIO COMMUNICATION SYSTEM, AND MOBILE RADIO COMMUNICATION METHOD

(75) Inventors: Nicolas Voyer, Rennes (FR); Yasuhiro Yano, Tokyo (JP); Hideshi Murai, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/371,902

(22) Filed: Mar. 10, 2006

(65) Prior Publication Data

US 2006/0153158 A1 Jul. 13, 2006

Related U.S. Application Data

(60) Division of application No. 11/048,906, filed on Feb. 3, 2005, which is a division of application No. 10/208,813, filed on Aug. 1, 2002, now Pat. No. 6,898,196, which is a division of application No. 09/467,063, filed on Dec. 20, 1999, now Pat. No. 6,469,995, which is a continuation of application No. PCT/JP99/01051, filed on Mar. 4, 1999.

(30) Foreign Application Priority Data

Apr. 23, 1998 (JP) ................................. 10-114003

(51) Int. Cl.
*H04B 7/216* (2006.01)
*H04J 3/06* (2006.01)
(52) U.S. Cl. ...................................... 370/342; 370/503
(58) Field of Classification Search .................... None
See application file for complete search history.

(56) References Cited

U.S. PATENT DOCUMENTS

| 5,619,491 A | 4/1997 | Panzer |
| 5,896,368 A | 4/1999 | Dahlman et al. |
| 6,122,270 A | 9/2000 | Whinnett et al. |
| 6,438,117 B1 | 8/2002 | Grilli et al. |
| 6,469,995 B1 | 10/2002 | Voyer et al. |
| 6,671,267 B1 | 12/2003 | Yano et al. |
| 6,898,196 B2 | 5/2005 | Voyer et al. |

FOREIGN PATENT DOCUMENTS

EP 0 427 687 5/1991

(Continued)

OTHER PUBLICATIONS

U.S. Appl. No. 11/371,885, Mar. 10, 2006, Voyer et al.

(Continued)

*Primary Examiner*—Andrew C. Lee
(74) *Attorney, Agent, or Firm*—Oblon, Spivak, McClelland, Maier & Neustadt, P.C.

(57) ABSTRACT

In the mobile radio communication system where the UMTS and an another system coexist an idle slot for observing the frequency component of another system is inserted in one superframe of UMTS. The duration of this idle slot is at most half of the duration of one frame that form the superframe and it is inserted at an interval of a specified number of frames. Therefore, the frequency component of the another system can be observed securely from the UMTS. Further, the deterioration of interleaving performance of the compressed mode frames during such observation can be suppressed.

1 Claim, 11 Drawing Sheets

FOREIGN PATENT DOCUMENTS

| | | |
|---|---|---|
| EP | 1 137 203 A2 | 9/2001 |
| JP | 3-145227 | 6/1991 |
| JP | 8503591 | 4/1995 |
| JP | 07-312783 | 11/1995 |
| JP | 8500475 | 1/1996 |
| JP | 8130766 | 5/1996 |
| JP | 10-512728 | 12/1998 |
| JP | 2000-509574 | 7/2000 |
| WO | WO 94/29981 | 12/1994 |
| WO | WO 96/23369 | 8/1996 |
| WO | WO 96/23390 | 8/1996 |
| WO | WO 97/40593 | 10/1997 |

OTHER PUBLICATIONS

U.S. Appl. No. 11/372,121, Mar. 10, 2006, Voyer et al.
U.S. Appl. No. 11/371,902, Mar. 10, 2006, Voyer et al.
U.S. Appl. No. 11/400,239, Apr. 10, 2006, Voyer et al.
Mouly, M., et al., "The GSM system for Mobile Communications," ISBN 2-9507190-0-7, France, 1992.
Gustafsson, M., et al., Compressed Mode Techniques for Inter-Frequency Measurements in a Wide-band DS-CDMA System, Proc. of IEEE 8$^{th}$ PIMRC, pp. 231-235.
European Telecommunications Standard Institute, pp. 48-50, XP-002171845. "TR 101146; Universal Mobile Telecommunication System," Dec. 1997.

FIG.1
(a)
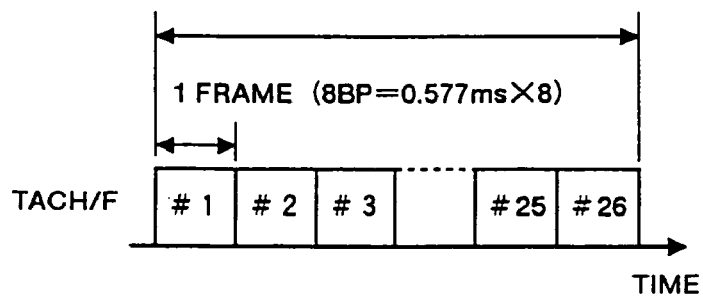
(b)
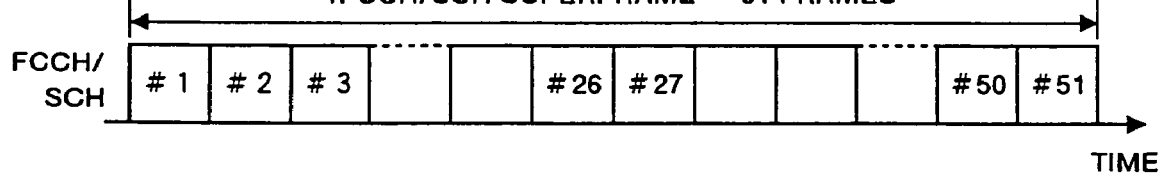
FIG.2
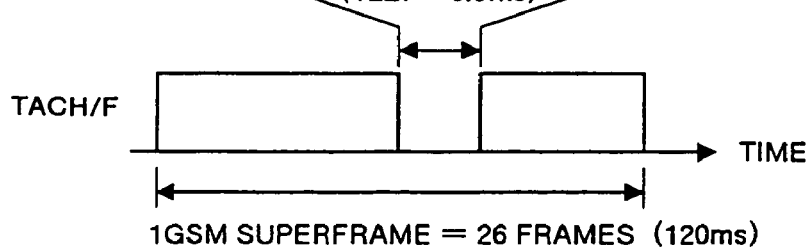

FIG.3
(a)
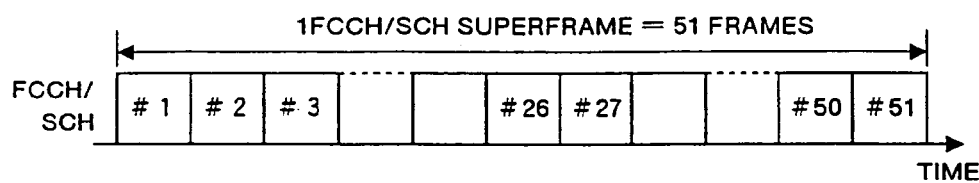
(b)
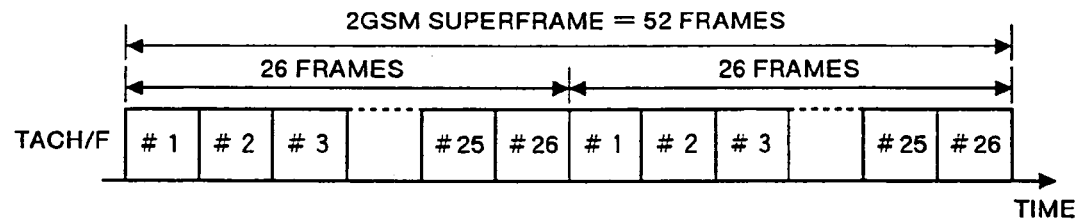
(c)
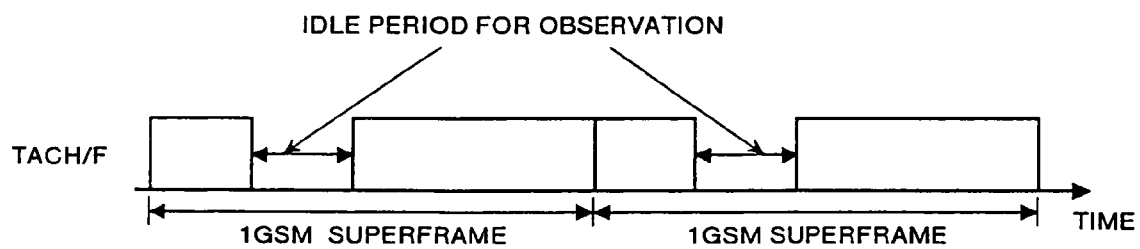

FIG.6
(a)
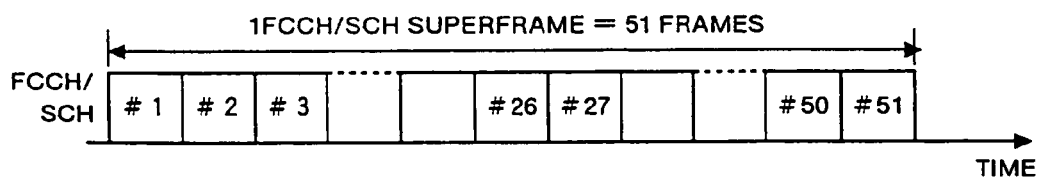
(b)
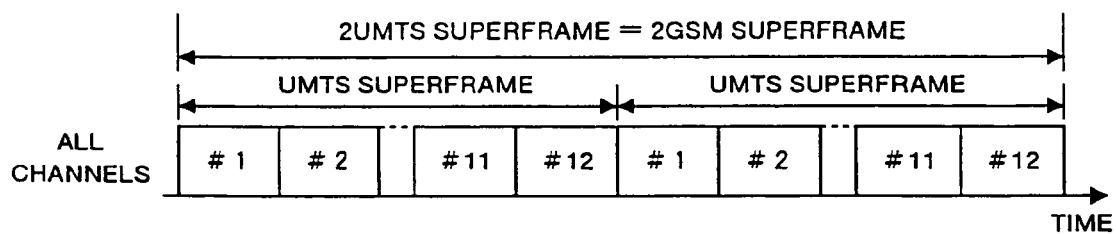
(c)
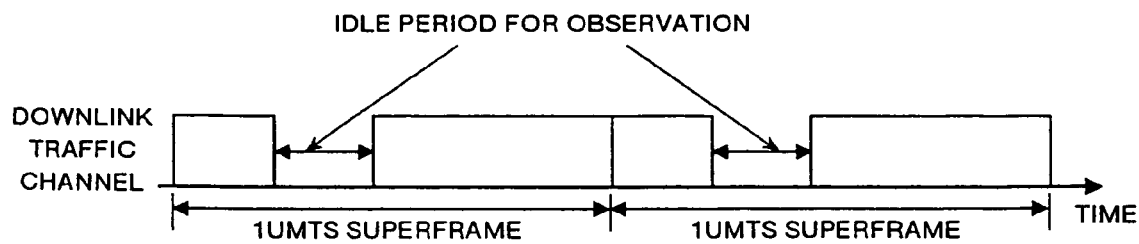
※ WHEN 12BP=6.9ms, SAME AS
HANDOVER BETWEEN GSM AND GSM

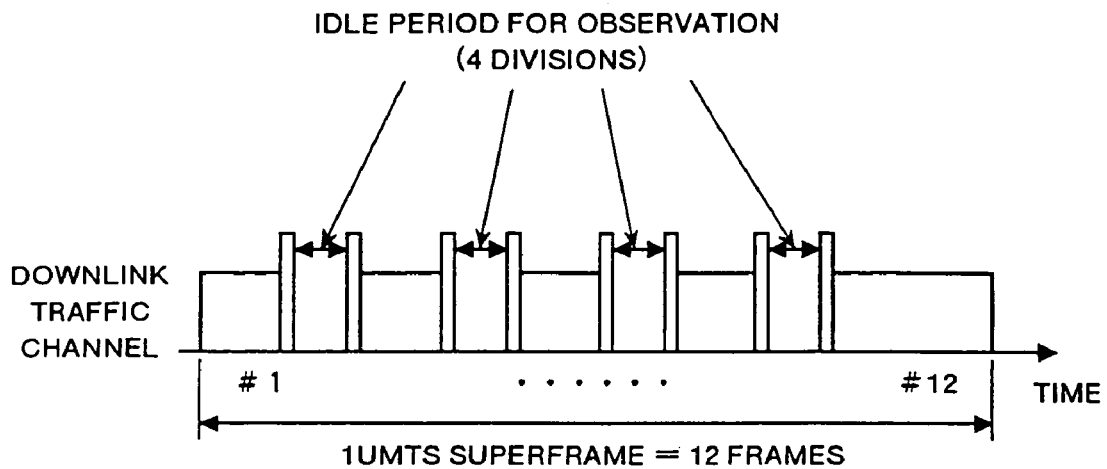
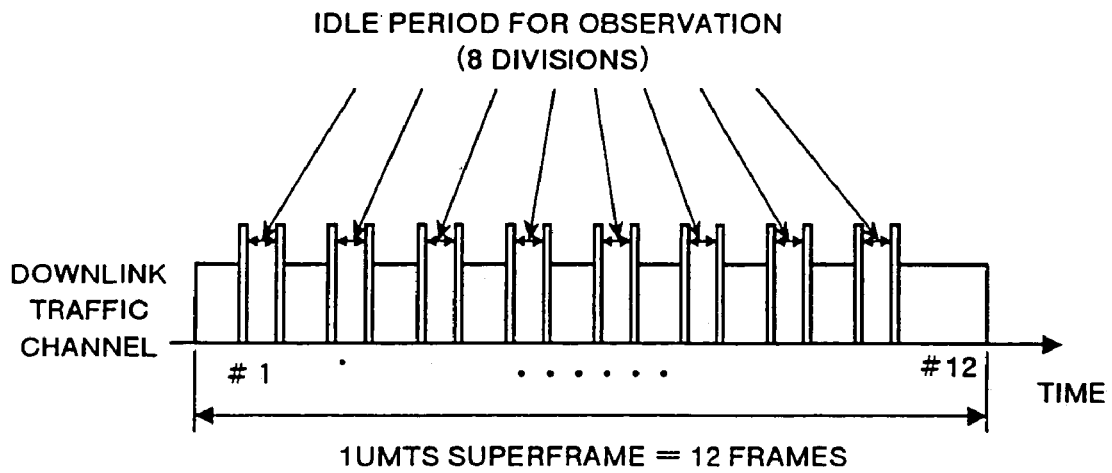

MOBILE RADIO COMMUNICATION SYSTEM, COMMUNICATION APPARATUS APPLIED IN A MOBILE RADIO COMMUNICATION SYSTEM, AND MOBILE RADIO COMMUNICATION METHOD

CROSS-REFERENCE TO RELATED APPLICATIONS

This application is a divisional of U.S. application Ser. No. 11/048,906, filed Feb. 3, 2005, which is a divisional of U.S. application Ser. No. 10/208,813, filed Aug. 1, 2002 now U.S. Pat. No. 6,898,196, which is a divisional of U.S. application Ser. No. 09/467,063 filed Dec. 20, 1999, now U.S. Pat. No. 6,469,995 issued Oct. 22, 2002, which is a continuation of International Application No. PCT/JP99/01051, filed Mar. 4, 1999, which is based upon and claims the benefit of priority from the prior Japanese Patent Application No. 10-114003, filed on Apr. 23, 1998. The contents of each application is incorporated herein by reference in their entirety.

TECHNICAL FIELD

The present invention relates to a mobile radio communication system in which UMTS (Universal Mobile Terrestrial communication System) and GSM (Group Specific Mobile) system coexist, communication apparatus applied in mobile radio communication system, and mobile radio communication method. More particularly this invention, relates to a technology of observing the control channel of a GSM system that is another system in the mobile radio communication system by making use of an idle period.

BACKGROUND ART

In a CDMA cellular system, because the same carrier frequency is used repeatedly in every cell there is no need for handovers between frequencies within the same system. However, considering a case such as when existing systems are present together, there is a need for handovers between different carrier frequencies. Three points pertaining to detailed cases are described below.

As a first point, in a cell where there is considerable traffic, a separate carrier frequency is used to accommodate the increased number of subscribers, and a handover may be performed between those cells. As a second point, when an umbrella cell constitution is used, different frequencies are allocated to large and small cells, and handovers are performed between the cells. Then, as a third point, there are cases of handovers between a third generation system, such as a W (Wideband)-CDMA system, and a second-generation system, such as a current mobile telephone system.

When performing handovers in cases such as those mentioned above, it is necessary to detect the power of carriers at the different frequencies. To achieve this detection, the receiver need only have a structure capable of detecting two frequencies. However, this increases the size of the constitution of the receiver, or makes the constitution complicated.

Furthermore, two types of handover method may be considered: a mobile assisted handover (MAHO) and a network assisted handover (NAHO). Comparing the MAHO and NAHO methods, NAHO reduces the burden of the mobile device. However, it is necessary to synchronize the mobile device and the base station, whereby the constitution of the base station and the network becomes complicated and large in order to be capable of tracking each dedicated mobile device.

For such reasons, the realization of the MAHO method is more desirable, but to determine whether or not to handover, it is necessary to measure the strength of carriers of different frequencies at the mobile devices. However, a CDMA cellular system differs from a time division multiple access (TDMA) system used in a second generation, in that it uses ordinarily continuous transmission for both transmission/reception. In this continuous transmission/reception technique, unless receivers corresponding to two frequencies are prepared, it is necessary to stop the timing of the transmission or the reception and measure the other frequency.

There has been disclosed a technique relating to a compressed mode method, for time-compressing the transmission data in the normal mode and transmitting it in a short time, thereby creating some spare time which can be utilized to measure the other frequency carrier. As an example of this, there is Japan Patent Application National Publication (Laid-Open) (JP-A) No. 8-500475 "Non-continuous Transmission for Seamless Handovers in DS-Mobile Radio Communications Systems". This application discloses a method of realizing a compressed mode, wherein the spreading factor of the spreading code used is lowered to compress the transmission timing.

The method of realizing the compressed mode according to the above application will be explained below. FIG. 13 shows an example of transmissions in a normal mode and a compressed mode in a conventional CDMA system. In FIG. 13, the vertical axis represents transmission rate/transmission power, and the horizontal axis represents time. In the example of FIG. 13, the compressed mode transmission is inserted between normal transmission frames. In the transmission in the compressed mode, a non-transmission period is provided in the downlink frame, and can be set to a desired period of time (duration). This non-transmission period represents idle period during which the strength of the other frequency carrier is measured. In this way, slot transmission can be achieved by inserting the idle period between transmission of compressed mode frames.

In this type of compressed mode transmission, transmission power is increased in accordance with the time ratio between the idle period and the frame (compressed mode frame) transmission duration. Therefore, as shown in FIG. 13, the compressed mode frame is transmitted at a higher transmission power than the frame in normal transmission. Consequently, transmission quality can be maintained even in frame transmission in compressed mode.

Usually, between the GSM and GSM, different frequency component (control channel) is observed by using one observation period (no-transmission period) assigned in every one superframe. However, when a mobile radio communication system in which the UMTS and GSM systems coexist is considered, it requires operation for observing the frequency components between different systems, that is, from UMTS to GSM system. In this case, too, same as in the case of observation between GSM and GSM, an idle period for observing the frequency component of GSM is set in the superframe of the UMTS.

That is, for one frame of superframe in the UMTS, it is necessary to assign the observation period composed of the same number of idle slots as in the case of GSM-GSM observation. However, in the existing technology, due to restrictions in the error correction code and spreading factor for frame transmission, it is difficult to insert all observation period in one frame, and there are many other problems. Therefore, a technology for observing the frequency component of GSM system from the UMTS is expected in the future.

It is an object of the present invention to solve the problems mentioned above by providing a mobile radio communication system, communication apparatus applied in mobile radio communication system, and mobile radio communication method, capable of observing securely the frequency component of an another system from the UMTS even when the UMTS and the another system coexist, and suppressing deterioration of interleaving performance of compressed mode frame in such a case.

SUMMARY OF THE INVENTION

The mobile radio communication system according to one aspect of the invention is a mobile radio communication system comprising a first communication system employing a code division multiple access method of transmitting frames by using a first superframe which is formed of a plural frames which expresses a frame transmission period, and a second communication system for observing frequency component of control data transmission channel by making use of a specified idle period, the specified idle period being inserted in a second superframe for downlink user data transmission channel on the basis of the difference between the number of frames of integer multiple of second superframe expressing a frame transmission period in user data transmission channel and the number of frames of third superframe expressing a frame transmission period in control data transmission channel, error correction and interleaving of frames being performed when the first communication system transmits the frames, wherein the specified idle period is at most half of the time of one frame that forms the first superframe and inserted in the first superframe at intervals of a specified number of frames, and wherein the frequency component of control data transmission channel of the second communication system is observed from the first communication system by making use of the idle period.

According to the above invention, when the first communication system and second communication system coexist, since the idle period for observing the frequency component of the second communication system is inserted at most in ½ time of one frame duration for composing one superframe of first communication system, at intervals of a specified number of frames, it is not required to observe the frequency component by one observation in one superframe, and the restrictions in frame transmission such as error correction code and spreading factor can be satisfied. Therefore, even when the first communication system and second communication system coexist, the frequency component of the second communication system can be securely observed from the first communication system. Further, deterioration of interleaving performance of the compressed mode frame during such observation can be suppressed.

In the mobile radio communication system according to another aspect of the invention, wherein the first communication system is the UMTS that transmits frames by using a first superframe which is formed of a plural frames and which expresses a frame transmission period, and wherein the second communication system is an another system that transmits frames by using a second superframe of an equal transmission period as the first superframe of the UMTS.

According to the above invention, in a case where the UMTS and another system coexist, since the idle period for observing the frequency component of the another system is inserted at most in ½ time of one frame duration for composing one superframe of UMTS, at intervals of a specified number of frames, it is not required to observe the frequency component by one observation in one superframe, and the restrictions in frame transmission such as error correction code and spreading factor can be satisfied. Therefore, even when the UMTS and another system coexist, the frequency component of the another system can be securely observed from the UMTS, and deterioration of interleaving performance of the compressed mode frame can be suppressed at this time. Besides, in the invention, the first superframe corresponds to the one UMTS superframe mentioned in an embodiment described later, the second superframe to the one GSM superframe, the third superframe to the one FCCH/SCH superframe, the user data transmission channel to the dedicated traffic channel, and the control data transmission channel to the common control channel, respectively.

In the mobile radio communication system according to another aspect of the invention, the interval of a specified number of frames is determined according to the difference in the transmission period between the UMTS and another system.

According to the above invention, since the interval of a specified number of frames is determined by the difference in the transmission period between the UMTS and another system, the different frequency components can be observed completely depending on the difference in the transmission period.

In the mobile radio communication system according to another aspect of the invention, the specified idle period is placed in the center of the frame that is the unit of a superframe of the UMTS.

According to the above invention, since the idle period is placed in the center of the frame which is the unit of superframe of the UMTS, the interleaving effect can be obtained securely.

The mobile radio communication system according to another aspect of the invention is a mobile radio communication system comprising a first communication system employing a code division multiple access method of transmitting frames by using a first superframe which is formed of a plural frames and which expresses a frame transmission period, and a second communication system for observing frequency component of control data transmission channel by making use of a specified idle period, the specified idle period being inserted in a second superframe for downlink user data transmission channel on the basis of the difference between the number of frames of integer multiple of second superframe expressing a frame transmission period in user data transmission channel and the number of frames of third superframe expressing a frame transmission period in control data transmission channel, error correction and interleaving of frames is performed when the first communication system transmits the frames, wherein the specified idle period is at most half of the time of one frame that forms the first superframe and inserted in the first superframe at not necessarily regular intervals of a specified number of slots, and wherein the frequency component of control data transmission channel of the second communication system is observed from the first communication system by making use of the idle period.

According to the above invention, in the case where the first communication system and second communication system coexist, since the idle period for observing the frequency component of the second communication system is inserted at most in ½ time of one frame duration for composing one superframe of first communication system, at intervals of a specified number of slots, it is not required to observe the frequency component by one observation in one superframe, and the restrictions in frame transmission such as error correction code and spreading factor can be satisfied. Therefore, even when the first communication system and second communication system coexist, the frequency component of the second communication system can be securely observed from the first communication system. Further, deterioration of interleaving performance of the compressed mode frame during such observation can be suppressed.

In the mobile radio communication system according to another aspect of the invention, wherein the first communication system is the UMTS that transmits frames by using a first superframe which is formed of a plural frames and which expresses a frame transmission period, and wherein the second communication system is an another system that transmits frames by using a second superframe of an equal transmission period as the first superframe of the UMTS.

According to the above invention, in the case where the UMTS and another system coexist, since the idle period for observing the frequency component of the another system is inserted at most in ½ time of one frame duration for composing one superframe of UMTS, at intervals of a specified number of slots, it is not required to observe the frequency component by one observation in one superframe, and the restrictions in frame transmission such as error correction code and spreading factor can be satisfied. Therefore, even when the UMTS and another system coexist, the frequency component of the another system can be securely observed from the UMTS, and deterioration of interleaving performance of the compressed mode frame can be suppressed. Besides, according to the invention, the first superframe corresponds to the one UMTS superframe mentioned in the embodiment described later, the second superframe to the one GSM superframe, the third superframe to the one FCCH/SCH superframe, the user data transmission channel to the dedicated traffic channel, and the control data transmission channel to the common control channel, respectively.

In the mobile radio communication system according to another aspect of the invention, the interval of a specified number of slots is determined according to the difference in the transmission period between the UMTS and the another system.

According to the above invention, since the interval of a specified number of slots is determined by the difference in the transmission period between the UMTS and another system, the different frequency components can be observed completely depending on the difference in the transmission period.

In the mobile radio communication system according to another aspect of the invention, the plural numbers of the specified idle periods are placed in the UMTS superframe and the idle period may be differently set in each frame.

According to the above invention, since the plural idle periods in the superframe of the UMTS are placed separately in each frame, the necessary idle duration is held in one superframe.

In the mobile radio communication system according to another aspect of the invention, the total of the idle period is equal to the specified idle period provided for observing the frequency component of the another systems.

According to the above invention, since the total of the plural idle periods is equal to the specified idle. period provided for observing the frequency component of the other systems, the total idle periods is equal to the observation duration of different frequencies between other systems can be held in one superframe.

In the mobile radio communication system according to another aspect of the invention, the frame in which the specified idle period is inserted is compressed and transmitted intermittently.

According to the above invention, since the frame in which the specified idle time is inserted is compressed and transmitted intermittently, a frame transmission of a high decodability is realized even when an idle period is inserted in one frame period.

In the mobile radio communication system according to another aspect of the invention, the compressed frame is generated by increasing the coding rate.

According to the above invention, since the compressed frame is generated by increasing the coding rate, the compression ratio is lowered, and the number of spreading codes of a shorter code length can be suppressed.

In the mobile radio communication system according to another aspect of the invention, the compressed frame is generated at a spreading factor that is the same as the spreading factor at which a frame that do not contain the specified idle period is generated.

According to the above invention, since the compressed frame is generated at a same spreading factor as another frame in which the specified idle period is not inserted, the interference and noise resistant characteristic to the compressed frame is assured.

The communication apparatus applied in a mobile radio communication system according to another aspect of the invention is a communication apparatus applied in a mobile radio communication system comprising a first communication system employing a code division multiple access method of transmitting frames by using a first superframe which is formed of a plural frames and which expresses a frame transmission period, and a second communication system for observing frequency component of control data transmission channel by making use of a specified idle period, the specified idle period being inserted in a second superframe for downlink user data transmission channel on the basis of the difference between the number of frames of integer multiple of second superframe expressing a frame transmission period in user data transmission channel and the number of frames of third superframe expressing a frame transmission period in control data transmission channel, error correction and interleaving of frames being performed when the first communication system transmits the frames, frames being transmitted continuously in the case of normal mode, and compressed frames being transmitted intermittently in the case of compressed mode, wherein the communication apparatus comprises a control unit for inserting a specified idle period, during the compressed mode, in the first superframe, having a duration that is at most portion of one frame that forms the first superframe, and at intervals of a specified number of frames, and wherein the frequency component of control data transmission channel of the second communication system is observed from the first communication system by making use of the specified idle period inserted by the control unit.

According to the above invention, in the case where the first communication system and second communication system coexist, since it is controlled so that the idle period for observing the frequency component of the second communication system is inserted at most in ½ time of one frame duration for composing superframe in the superframe of the first communication system, it is not required to observe the frequency component by one observation in one superframe, and the restrictions in frame transmission such as error correction code and spreading factor can be satisfied. Therefore, even when the first communication system and second communication system coexist, the frequency component of the second communication system can be securely observed from the first communication system. Further, deterioration of interleaving performance of the compressed mode frame during such observation can be suppressed.

In the communication apparatus applied in a mobile radio communication system according to another aspect of the invention, wherein the first communication system is the UMTS that transmits frames by using a first superframe which is formed of a plural frames and which expresses a frame transmission period, and wherein the second communication system is an another system that transmits frames by using a second superframe of an equal transmission period as the first superframe of the UMTS.

According to the above invention, in the case where the UMTS and another system coexist, since the idle period for observing the frequency component of the another system is inserted at most in ½ time of one frame duration for composing one superframe of UMTS, at intervals of a specified number of frames, it is not required to observe the frequency component by one observation in one superframe, and the restrictions in frame transmission such as error correction code and spreading factor can be satisfied. Therefore, even when the UMTS and another system coexist, the frequency component of the another system can be securely observed from the UMTS, and deterioration of interleaving performance of the compressed mode frame can be suppressed. Besides, in the invention, the first superframe corresponds to the one UMTS superframe mentioned in the embodiment described later, the second superframe to the one GSM superframe, the third superframe to the one FCCH/SCH superframe, the user data transmission channel to the dedicated traffic channel, and the control data transmission channel to the common control channel, respectively.

In the communication apparatus applied in a mobile radio communication system according to another aspect of the invention, the control unit determines the interval of a specified number of frames according to the difference in the transmission period between the UMTS and the another system.

According to the above invention, since the interval of a specified number of frames is determined by the difference in the transmission period between the UMTS and another system at the time of controlling, the different frequency components can be observed completely depending on the difference in the transmission period.

In the communication apparatus applied in a mobile radio communication system according to another aspect of the invention, the control unit places the specified idle period in the center of the frame that is the unit of superframe of the UMTS.

According to the above invention, since the specified idle period is placed in the center of the frame which is the unit of superframe of the UMTS at the time of controlling, the interleaving effect may be obtained securely.

The communication apparatus applied in a mobile radio communication system in a different aspect of the invention is a communication apparatus applied in a mobile radio communication system comprising a first communication system employing a code division multiple access method of transmitting frames by using a first superframe which is formed of a plural frames and which expresses a frame transmission period, and a second communication system for observing frequency component of control data transmission channel by making use of a specified idle period, the specified idle period being inserted in a second superframe for downlink user data transmission channel, on the basis of the difference between the number of frames of integer multiple of second superframe expressing a frame transmission period in user data transmission channel and the number of frames of third superframe expressing a frame transmission period in control data transmission channel, error correction and interleaving of frames being performed when the first communication system transmits the frames, frames being transmitted continuously in the case of normal mode, and compressed frames being transmitted intermittently in the case of compressed mode, wherein the communication apparatus comprises a control unit for inserting a specified idle period, during the compressed mode, in the first superframe, having a duration that is at most portion of one frame that forms the first superframe, and at not necessarily regular intervals of a specified number of slots, and wherein the frequency component of control data transmission channel of the second communication system is observed from the first communication system by making use of the specified idle period inserted by the control unit.

According to the above invention, in the case where the first communication system and second communication system coexist, since it is controlled so that the idle period for observing the frequency component of the second communication system is inserted at most in ½ time of one frame duration for composing superframe in the superframe of the first communication system and at an interval of a specified number of slots, it is not required to observe the frequency component by one observation in one superframe, and the restrictions in frame transmission such as error correction code and spreading factor can be satisfied. Therefore, even when the first communication system and second communication system coexist, the frequency component of the second communication system can be securely observed from the first communication system. Further, deterioration of interleaving performance of the compressed mode frame during such observation can be suppressed.

In the communication apparatus applied in a mobile radio communication system according to another aspect of the invention, the first communication system is the UMTS that transmits frames by using wherein the first communication system is the UMTS that transmits frames by using a first superframe which is formed of a plural frames and which expresses a frame transmission period, and wherein the second communication system is an another system that transmits frames by using a second superframe of an equal transmission period as the first superframe of the UMTS.

According to the above invention, in the case where the UMTS and another system coexist, since the idle period for observing the frequency component of the another system is inserted at most in ½ time of one frame duration for composing one superframe of UMTS, at intervals of a specified number of slots, it is not required to observe the frequency component by one observation in one superframe, and the restrictions in frame transmission such as error correction code and spreading factor can be satisfied, and therefore even when the UMTS and another system coexist, the frequency component of the another system can be securely observed from the UMTS, and deterioration of interleaving performance of the compressed mode frame can be suppressed. Besides, according to the invention, the first superframe corresponds to the one UMTS superframe mentioned in the embodiment described later, the second superframe to the one GSM superframe, the third superframe to the one FCCH/SCH superframe, the user data transmission channel to the dedicated traffic channel, and the control data transmission channel to the common control channel, respectively.

In the communication apparatus applied in a mobile radio communication system according to another aspect of the invention, the control unit determines the interval of a specified number of frames according to the difference in the transmission period between the UMTS and the another system.

According to the above invention, since the interval of a specified number of slots is determined by the difference in the transmission period between the UMTS and another system at the time of controlling, different frequency components can be observed completely depending on the difference in the transmission period.

In the communication apparatus applied in a mobile radio communication system according to another aspect of the invention, the control unit provides the specified idle period at many places in the UMTS superframe and the sets each idle period differently in each frame.

According to the above invention, since plural idle periods are disposed in each frame in the superframe of the UMTS at the time of controlling, a necessary idle duration can be held in one superframe.

In the communication apparatus applied in a mobile radio communication system according to another aspect of the invention, the control unit sets the idle period in such a way that the total of then is equal to the specified idle duration provided for observing the frequency component between the another systems.

According to the above invention, since the total of the plural idle periods is set equal to the specified idle duration provided for observing the frequency component between the other systems at the time of controlling, an idle duration equal to observation of different frequencies between other systems can be held in one superframe.

In the communication apparatus applied in a mobile radio communication system according to another aspect of the invention, the control unit increases the coding rate when generating the compressed frame.

According to the above invention, since the compressed frame is generated by increasing the coding rate at the time of controlling, the compression ratio is lowered, and the number of spreading codes of a shorter code length can be suppressed.

In the communication apparatus applied in a mobile radio communication system according to another aspect of the invention, the control unit sets a spreading factor when generating the compressed mode frame that is the same as the spreading factor at which a frame that do not contain the specified idle period is generated.

According to the above invention, since the compressed frame is generated at a same spreading factor as another frame in which the specified idle period is not inserted at the time of controlling, the interference and noise resistant characteristic of the compressed frame is assured.

In the communication apparatus applied in a mobile radio communication system according to another aspect of the invention, the control unit increases the average transmission power during the compressed mode.

According to the above invention, since the average transmission power is increased in the compressed mode at the time of controlling, the characteristic deterioration may be suppressed to a minimum limit.

The mobile radio communication method according to another aspect of the invention is a mobile radio communication method, applied in a mobile radio communication system having, a first communication system employing a code division multiple access method of transmitting frames by using a first superframe which is formed of a plural frames and which expresses a frame transmission period, and a second communication system for observing frequency component of control data transmission channel by making use of a specified idle period, the specified idle period being inserted in a second superframe for downlink user data transmission channel on the basis of the difference between the number of frames of integer multiple of second superframe expressing a frame transmission period in user data transmission channel and the number of frames of third superframe expressing a frame transmission period in control data transmission channel, error correction and interleaving of frames being performed when the first communication system transmits the frames, frames being transmitted continuously in the case of normal mode, and compressed frames being transmitted intermittently in the case of compressed mode, the method comprising a first step of compressing frames to be transmitted intermittently during the compressed mode, and a second step of transmitting the frames compressed in the first step intermittently by inserting a specified idle period, in the first superframe, having a duration that is at most portion of one frame that forms the first superframe, and at intervals of a specified number of frames determined by the relation of the frame structure between the first communication system and the second communication system, and the frequency component of control data transmission channel of the second communication system being observed from the first communication system by making use of the specified idle period inserted in the second step.

According to the above invention, by compressing the frames transmitted intermittently at the time of compressed mode, and inserting an idle period for observing the frequency component of the second communication system at most in ½ time of one frame duration for composing the superframe of the first communication system in the superframe of the first communication system and at an interval of a specified number of frames determined by the relation of the frame structure between the first communication system and second communication system, since the step for transmitting intermittently the compressed frames is set up, it is not required to observe the frequency component by one observation in one superframe, and the restrictions in frame transmission such as error correction code and spreading factor can be satisfied. Therefore even when the first communication system and second communication system coexist, the frequency component of the second communication system can be securely observed from the first communication system. Further, deterioration of interleaving performance of the compressed mode frame during such observation can be suppressed.

The mobile radio communication method according to another aspect of the invention is a mobile radio communication method, applied in a mobile radio communication system having, a first communication system employing a code division multiple access method of transmitting frames by using a first superframe which is formed of a plural frames and which expresses a frame transmission period, and a second communication system for observing frequency component of control data transmission channel by making use of a specified idle period, the specified idle period being inserted in a second superframe for downlink user data transmission channel on the basis of the difference between the number of frames of integer multiple of second superframe expressing a frame transmission period in user data transmission channel and the number of frames of third superframe expressing a frame transmission period in control data transmission channel, error correction and interleaving of frames being performed when the first communication system transmits the frames, frames being transmitted continuously in the case of normal mode, and compressed frames being transmitted intermittently in the case of compressed mode, the method comprising a first step of compressing frames to be transmitted intermittently during the compressed mode, and a second step of transmitting the frames compressed in the first step intermittently by inserting a specified idle period, in the first superframe, having a duration that is at most half of one frame that forms the first superframe, and at intervals of a specified number of slots determined by the relation of the frame structure between the first communication system and the second communication system, and the frequency component of control data transmission channel of the second communication system being observed from the first communication system by making use of the specified idle period inserted in the second step.

According to the above invention, by compressing the frames transmitted intermittently at the time of compressed mode, and inserting an idle period for observing the frequency component of the second communication system at most in ½ time of one frame duration for composing the superframe of the first communication system in the superframe of the first communication system and at an interval of a specified number of slots determined by the relation of the frame structure between the first communication system and second communication system, since the step for transmitting intermittently the compressed frames is set up, it is not required to observe the frequency component by one observation in one superframe, and the restrictions in frame transmission such as error correction code and spreading factor can be satisfied. Therefore even when the first communication system and second communication system coexist, the frequency component of the second communication system can be securely observed from the first communication system. Further, deterioration of interleaving performance of the compressed mode frame during such observation can be suppressed.

In the mobile radio communication method in another aspect of the invention, the first communication system is the UMTS that transmits frames by using a first superframe expressing a frame transmission period, wherein the first communication system is the UMTS that transmits frames by using a first superframe which is formed of a plural frames and which expresses a frame transmission period, and wherein the second communication system is an another system that transmits frames by using a second superframe of an equal transmission period as the first superframe of the UMTS.

According to the above invention, in particular, in the case where the UMTS and another system coexist, since the idle period for observing the frequency component of the another system is inserted at most in ½ time of one frame duration for composing one superframe of UMTS, at intervals of a specified number of frames or at an interval of a specified number of slots, it is not required to observe the frequency component by one observation in one superframe, and the restrictions in frame transmission such as error correction code and spreading factor can be satisfied, and therefore even when the UMTS and another system coexist, the frequency component of the another system can be securely observed from the UMTS, and deterioration of interleaving performance of the compressed mode frame can be suppressed. Besides, according to the invention, the first superframe corresponds to the one UMTS superframe mentioned in the embodiment described later, the second superframe to the one GSM superframe, the third superframe to the one FCCH/SCH superframe, the user data transmission channel to the dedicated traffic channel, and the control data transmission channel to the common control channel, respectively.

In the mobile radio communication method according to another aspect of the invention, the compressed frames are generated in the first step by increasing the coding rate.

According to the above invention, since the compressed frame is generated by increasing the coding rate at this step, the compression ratio is lowered, and the number of spreading codes of a shorter code length can be suppressed.

In the mobile radio communication method according to another aspect of the invention, the compressed frame is generated in the first step at a spreading factor that is the same as the spreading factor at which a frame that do not contain the specified idle period is generated.

According to the above invention, since the compressed frame is generated at a same spreading factor as another frame in which the specified idle period is not inserted at this step, the interference and noise resistant characteristic to the compressed frame is assured.

In the mobile radio communication method according to another aspect of the invention, average transmission power is increased in the second step during the compressed mode.

According to the above invention, since the average transmission power is increased in the compressed mode at this step, the characteristic deterioration may be suppressed to a minimum limit.

BRIEF DESCRIPTION OF THE DRAWINGS

FIG. 1 shows a frame format applied in a GSM system, FIG. 1(a) is a diagram for explaining the frame format of dedicated traffic channel, and FIG. 1(b) is a diagram for explaining the frame format of common control channel;

FIG. 2 is a diagram for explaining the observation period of GSM superframe applied in the GSM system;

FIG. 3 shows an observation method of different frequency components between GSM and GSM, FIG. 3(a) is a diagram for explaining the frame format of common control channel, FIG. 3(b) is a diagram for explaining the frame format of dedicated traffic channel in relation to the common control channel, and FIG. 3(c) is a diagram for explaining the observation period inserted in every GSM superframe;

FIG. 5(a) is a diagram for explaining the frame format of dedicated traffic channel applied in the GSM system, and FIG. 5(b) is a diagram for explaining the format of superframe of UMTS;

FIG. 6 shows an observation method of different frequency components between GSM and UMTS, FIG. 6(a) is a diagram for explaining the frame format of common control channel applied in the GSM system, FIG. 6(b) is a diagram for explaining the relation of superframe between the UMTS and GSM systems, and FIG. 6(c) is a diagram for explaining the observation period inserted in every superframe in the UMTS;

FIG. 11 is a diagram for explaining the frame transmission of downlink according to a second embodiment of the invention;

FIG. 12 is a diagram for explaining the frame transmission of downlink according to a third embodiment of the invention.

BEST MODE FOR CARRYING OUT THE INVENTION

Referring now to the accompanying drawings, preferred embodiments of mobile radio communication system, communication apparatus applied in mobile radio communication system, and mobile radio communication method of the invention are described in detail below.

First, the principle of a first embodiment of the invention is described. In the first embodiment of the invention, a mobile radio communication system in which UMTS and GSM systems coexist is presented as an example. To begin with, the existing system, GSM system, is explained. FIG. 1 shows a frame format applied in the GSM system. More specifically, FIG. 1(*a*) is a diagram for explaining the frame format of dedicated traffic channel, and FIG. 1(*b*) is a diagram for explaining the frame format of common control channel.

In the GSM system, TACH (Traffic and Associated Channel) is defined as the dedicated traffic channel, and FCCH (Frequency Correction Channel) and SCH (Synchronization Channel) are defined as the common control channel. In the dedicated traffic channel TACH, as shown in FIG. 1(*a*), the period of transmitting the transmission unit of frame from #1 to #26 is designated as one GSM superframe. One frame has a duration of 8 BP (burst period). One BP is 0.577 ms. Therefore, one GSM superframe has a transmission period of 120 ms. In the common control channel FCCH/SCH, as shown in FIG. 1(*b*), the period of transmitting 8 BP frame from #1 to #51 is one FCCH/SCH superframe.

Figure 4:
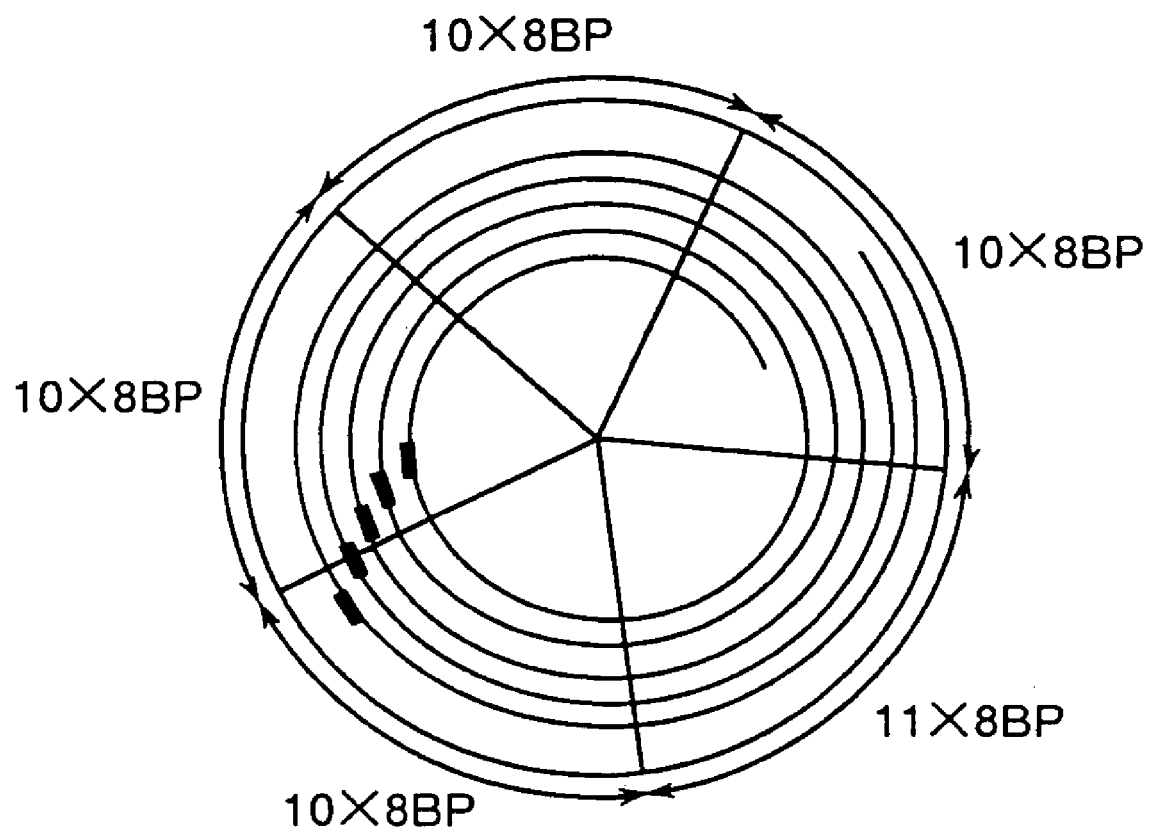
FIG. 4 is a diagram for explaining an observation method in the GSM system.

The observation method of different frequency components between GSM and GSM is described next. FIG. 2 is a diagram for explaining the observation period of GSM superframe applied in the GSM system. FIG. 3 shows an observation method of different frequency components between GSM and GSM. More specifically, FIG. 3(*a*) is a diagram for explaining the frame format of common control channel. FIG. 3(*b*) is a diagram for explaining the frame format of dedicated traffic channel in relation to the common control channel. FIG. 3(*c*) is a diagram for explaining the observation period inserted in every GSM superframe. FIG. 4 is a diagram for explaining an observation example in the dedicated traffic channel of the GSM system. This FIG. 4 is disclosed in the publication "The GSM System for Mobile Communication" by Michel MOULY and Marie-Bernadette PAUTET (international standard book number 2-9507190-0-7).

In the GSM system, the no-transmission period (idle period) assigned for one GSM superframe is 12 BP (=6.9 ms) as shown in FIG. 2. At the time of handover, different frequency component (control channel) of another GSM system is observed and detected by making use of this no-transmission period. The FCCH/SCH superframe is composed of 51 frames (see FIG. 3(*a*)). On the contrary, the GSM superframe (see FIG. 3(*b*)) has 52 frames in two periods. Comparing these two superframes, therefore, there is a difference of one frame. That is, the FCCH/SCH superframe is short of one frame. Since the observation period is once in one GSM superframe, in two GSM superframes, the frequency is observed and detected two times (see FIG. 3(*c*)).

This observation and detection procedure is shown in FIG. 4. There is a difference of one frame between one FCCH/SCH superframe in common control channel and two GSM superframes in dedicated traffic. The position of the observation period assigned for one GSM superframe is fixed in the dedicated traffic channel TACH/F. Therefore, frequency is observed in a specified frame of every GSM superframe. When the FCCH/SCH superframe is composed of the same number of frames as the two GSM superframes, the same frame number is observed between GSM and GSM all the time. However, since there is a difference of one frame between FCCH/SCH superframe and two GSM superframes, observation is shifted by one frame each in every observation.

Incidentally, one FCCH/SCH superframe corresponds to two periods of GSM superframe so that the frequency is observed and detected twice in every one FCCH/SCH superframe. That is, the time difference in this pair of observation periods is one GSM superframe, and the pair of observations progress in a form shifted by one period of one GSM superframe. Therefore, in a frequency handover between GSM and GSM, the frequency is observed and detected in such a manner that the timing of the observation and detection is shifted twice in every one period of FCCH/SCH superframe and by one frame each in every one period.

Figure 5:
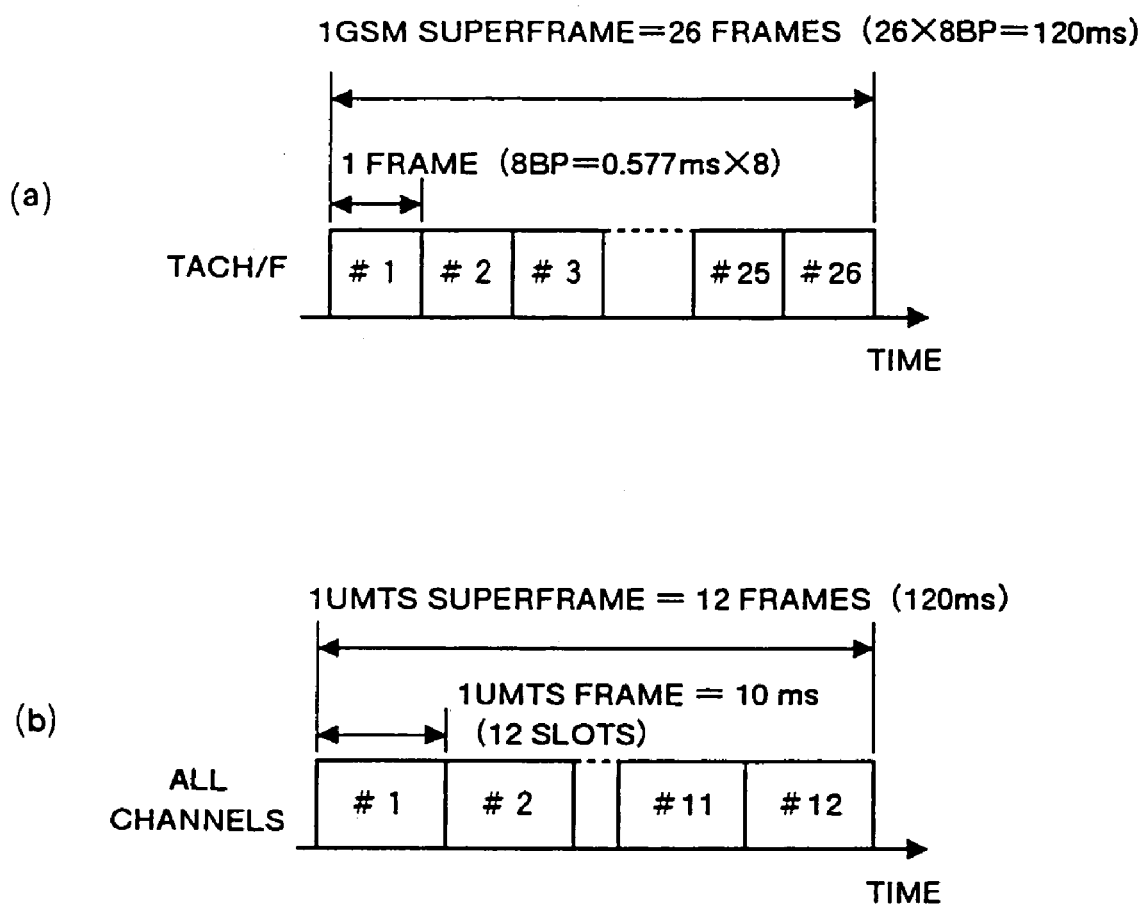
FIG. 5 show a frame format applied in the UMTS.

The next-generation system, UMTS, is explained below. FIG. 5 shows a frame format applied in the UMTS. More specifically, FIG. 5(*a*) is a diagram for explaining the frame format of dedicated traffic channel applied in the GSM system. FIG. 5(*b*) is a diagram for explaining the format of superframe of UMTS.

In the GSM system, in the dedicated traffic channel TACH mentioned above, as shown in FIG. 5(*a*), the period of transmitting the frames, which is the unit of transmission, from #1 to #26 is designated as one GSM superframe. One frame has duration of 8 BP (burst period). In the UMTS, on the other hand, the UMTS superframe is composed of the same period as in this GSM superframe. That is, in the UMTS, in all channels, as shown in FIG. 5(*b*), the period of transmitting frames from #1 to #12, each having duration of 10 ms, is one UMTS superframe.

The observation method of different frequency components between GSM and UMTS is described next. FIG. 6 shows the observation method of different frequency components between GSM and UMTS. More specifically, FIG. 6(*a*) is a diagram for explaining the frame format of common control channel applied in the GSM system. FIG. 6(*b*) is a diagram for explaining the relation of superframe between the UMTS and GSM systems. FIG. 6(*c*) is a diagram for explaining the observation period inserted in every superframe in the UMTS.

As mentioned above, the FCCH/SCH superframe is composed of 51 frames (see FIG. 6(*a*)). On the contrary, the GSM superframe has 52 frames in two periods (see FIG. 3(*b*)). The GSM superframe and UMTS superframe are equal in the duration of one period. Therefore, the relation between the FCCH/SCH superframe and the UMTS superframe coincides with the relation between the FCCH/SCH superframe and the GSM superframe explained above. That is, there is a difference of one frame in the FCCH/SCH superframe and two UMTS superframes (see FIG. 6(b)).

Herein, in frequency handover between UMTS and GSM, in order to obtain the same function as in frequency handover between GSM and GSM mentioned above, observation period of about 6.9 ms is required in one UMTS superframe. Accordingly, as shown in FIG. 6(c), observation and detection is carried out twice in two UMTS superframes. Only when 12 BP=6.9 ms, it is same as the handover between GSM and GSM.

In this handover between UMTS and GSM, however, due to restrictions of error correction code and spreading factor, it is impossible to assign all necessary observation period for one frame in one superframe. That is, the operation for increasing the coding rate of the error correction code cannot be increased more than the number of information bits of the non-coding case. Further, in the UMTS, the frame length is 10 ms, and since the no-transmission period of about 6.9 ms for observation of different frequency components is more than half of the frame length, deterioration of interleaving performance is predicted. Further, in order to prepare the no-transmission period of about 6.9 ms in one frame, it is required to reduce the transmission period to about 3.1 ms. Therefore the transmission power in the compressed mode transmission should be increased. This results in a problem that the interference power on another channels is instantly increased.

It may be hence considered to observe and detect different frequency components in one UMTS superframe by dividing in plural times. In this case, the time performance for compensating for control channel of GSM channel is same as when preparing an observation period once in every one UMTS superframe. Consequently, the number of idle slots for obtaining one observation period can be set smaller than in the case between GSM and GSM. The idle slots can be generated by using punctured code or higher coding rate of error correction coding.

In the first embodiment, the frequency is observed and detected twice in every one UMTS superframe. Hence, in two UMTS superframes, the frequency is observed and detected four times.

Figure 7:
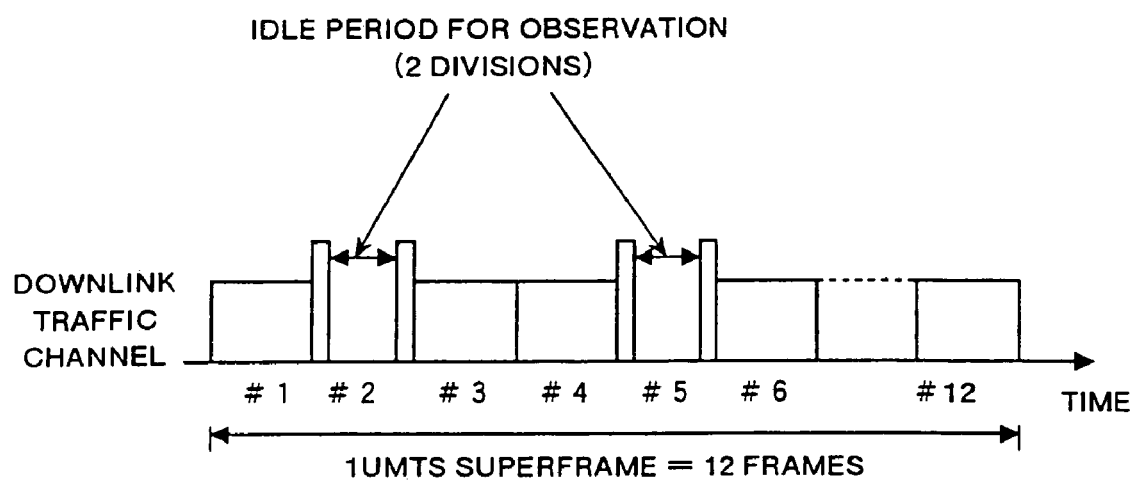
FIG. 7 is a diagram for explaining the frame transmission of downlink according to a first embodiment of the invention.

The observation and detection method is explained by referring to FIG. 7. FIG. 7 is a diagram for explaining the frame transmission of downlink in the first embodiment of the invention. In FIG. 7, the axis of ordinates denotes the transmission rate or transmission power, and the axis of abscissas represents the time. There is a difference of one frame between one FCCH/SCH superframe and two UMTS superframes in the common control channel. In the dedicated traffic channel TACH/F, the position of observation period assigned in one GSM superframe is fixed. Similarly, in the UMTS also the positions of two observation periods assigned in one UMTS superframe in the downlink traffic channel are fixed. Therefore, frequency is observed and detected in specified frames (two positions) of every UMTS superframe. Thus, since there is a difference of one frame between one FCCH/SCH superframe and two UMTS superframes, one frame is shifted each in each observation.

Since one FCCH/SCH superframe corresponds to two periods of UMTS superframe, the frequency is observed and detected four times in one FCCH/SCH superframe. That is, the time difference in the pair of observation periods corresponds to one UMTS superframe in every UMTS superframe, and the pair of observations progress in a form shifted by one period of one FCCH/SCH superframe. Therefore, in frequency handover between UMTS and GSM, the frequency is observed and detected four times in every period of FCCH/SCH superframe, and while shifting by one frame each in every period of observation.

The observation period, that is, the idle slot is set in the center of a specified frame. Hence, interleaving effect is obtained in the compressed mode frame transmission. Further, by increasing the coding rate in punctured coding or error correction coding, the redundancy is further decreased, and the idle period can be set longer proportionally. In this case, the quantity of information to be transmitted is decreased, the spreading factor can be kept unchanged. That is, the interference and noise resistant characteristic may be maintained. Incidentally, the characteristic deteriorates when transmitting compressed frames so that the transmission power must be slightly increased as compared to the normal transmission.

Figure 8:
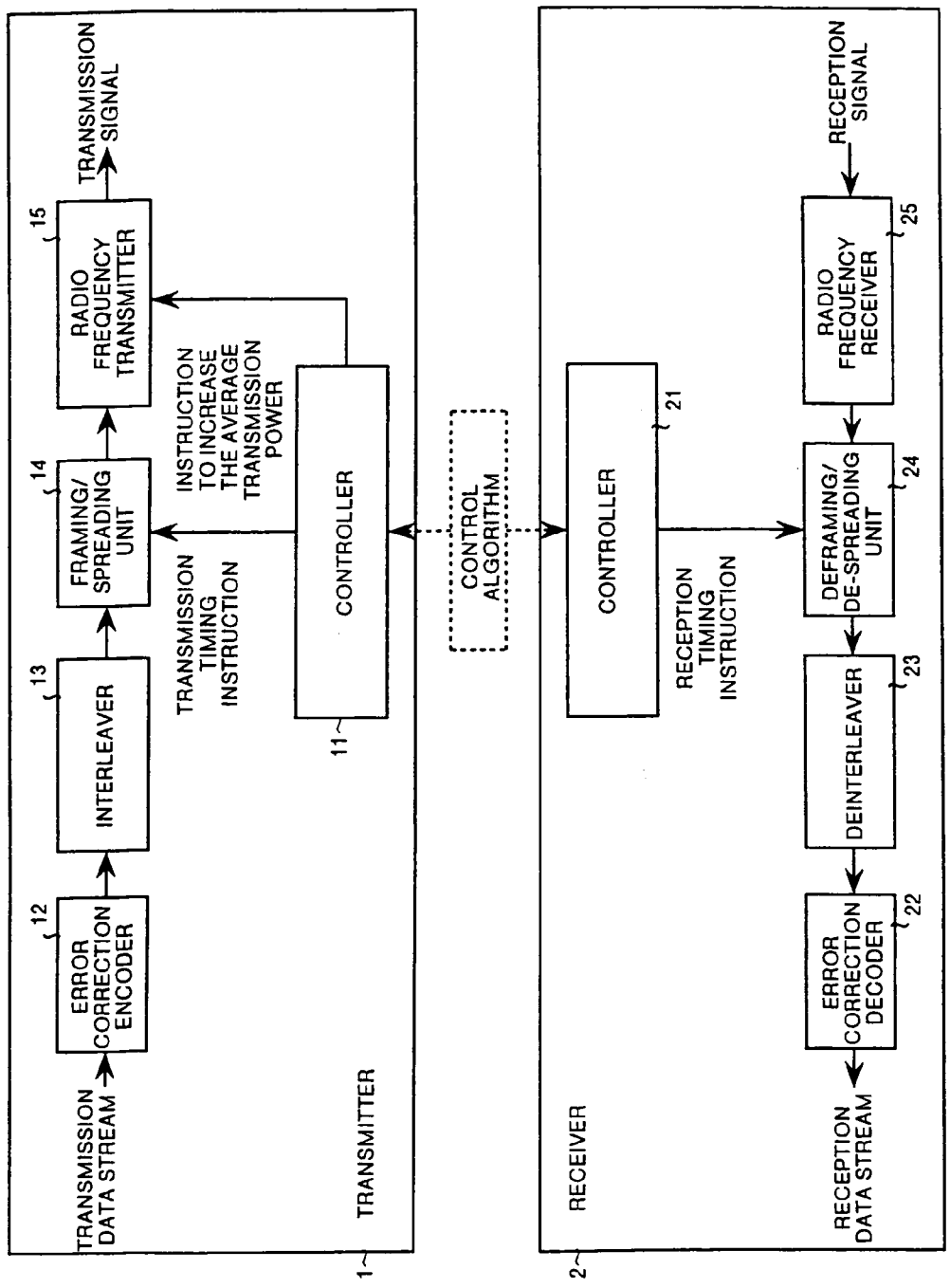
FIG. 8 is a block diagram showing a mobile radio communication system according to the first embodiment of the invention.

A specific example of mobile communication system is discussed below. FIG. 8 is a block diagram showing a mobile radio communication system according to the first embodiment of the invention. The mobile radio communication system consists of a transmitter 1 and a receiver 2. Such a system is installed at both, a base station and a mobile station. In this mobile radio communication system, for example, W (wideband)-CDMA (code division multiple access) communication method is applied.

The transmitter 1 comprises, as shown in FIG. 8, a controller 11, an error correction encoder 12, an interleaver 13, a framing/spreading unit 14, a radio frequency transmitter 15, etc. The controller 11 controls the operation of the interleaver 13, framing/spreading unit 14, and radio frequency transmitter 15 mainly through negotiation with the receiver 2. This controller 11 controls the operation suited to normal mode (non-compressed mode) and compressed mode by negotiation with the receiver 2. More specifically, the controller 11 instructs the transmission timing for transmitting the compressed mode frames, in compressed mode, to the framing/spreading unit 14. The controller 11 also instructs increase of average transmission power when transmitting compressed mode frames to the radio frequency transmitter 15.

The error correction encoder 12 obtains coded data by error correction coding of transmission data stream. The interleaver 13 permutes the time sequence of (interleaves) the coded data in bit units in order to minimize the effects of transmission error in the event of, for example, loss of continuous bits of transmission signal due to fading during transmission. The interleaver 13 has a memory for interleaving one frame.

The framing/spreading unit 14 spreads wider by using a spreading code of each user, depending on normal mode or compressed mode, and forms a frame depending on each mode. When transmission timing depending on the mode is instructed from the controller 11, this framing/spreading unit 14 sends out the frame to the radio frequency transmitter 15 at the transmission timing. The radio frequency transmitter 15 converts the transmission signal obtained from the framing/spreading unit 14 into radio frequency, and transmits. The radio frequency-transmitter 15 increases the average transmission power in the compressed mode as compared with that of the normal mode according to the control of the controller 11, and outputs a transmission signal.

The receiver 2 comprises, as shown in FIG. 8, a controller 21, an error correction decoder 22, a deinterleaver 23, a deframing/de-spreading unit 24, a radio frequency receiver 25, etc. The controller 21 controls the operation of the deinterleaver 23 and deframing/de-spreading unit 24 mainly through negotiation with the transmitter 1. This controller 21 controls the operation suited to the normal mode and compressed mode by negotiation with the transmitter 1. More specifically, the controller 21 instructs reception timing for receiving the compressed mode frames in the compressed mode to the deframing/de-spreading unit 24.

The radio frequency receiver 25 demodulates the reception signal sent from an antenna not shown. The deframing/de-spreading unit 24 de-spreads using the spreading signal assigned to the user of the receiver 2 depending on the normal mode or compressed mode, and forms a frame suited to each mode. When reception timing depending on each mode is instructed from the controller 21, the deframing/de-spreading unit 24 receives the reception signal from the radio frequency receiver 25 at this reception timing.

The deinterleaver 23 permutes the time sequence (de-interleaves) of the coded data in bit units in the reverse sequence of interleaving in the transmitter 1. The deinterleaver 23, like the interleaver 13, has a memory for interleaving one frame. The error correction decoder 22 decodes the de-interleaved signal, and obtains decoded data, that is, reception data stream.

Explained next is the frame transmission including, compressed mode. In this mobile radio communication system, in compressed mode, a period of transmitting intermittently by forming frames into slots is provided, and by making use of no-transmission period in this period, the intensity of different frequency carrier is measured. For this purpose, frames formed into slots must be compressed, but when interleaved same as in ordinary transmission, sufficient interleaving time is not available, and enough interleaving effect cannot be obtained.

Accordingly, the transmission period of compressed frame in one frame is divided. One portion is assigned at the beginning of a frame area, and the other portion is set at the end of the same frame area, so that a required interleaving time may be obtained. That is, the idle slot corresponding to the observation period is placed in the center of a frame. In the receiver 2, this operation is reverse.

Herein, the relation between the number of idle slots and the number of slots in the compressed mode frame is described. Supposing one frame to be composed of 16 slots, the number of slots in the first half to be A, the number of idle slots to be B, and the number of slots in the second half to be C, the following combinations can be considered. That is, $$(A, B, C)=(7, 1, 8)/(7, 2, 7)/(6, 3, 7)/(6, 4, 6)/(5, 5, 6)/(5, 6, 5)$$

According to these combinations, for example, supposing the number of slots in the first half and second half to be 7 slots and 8 slots respectively, one slot in the center of the frame is inserted as an idle slot.

When a short idle slot such as one or two slots is assigned per frame, only punctured coding may be used. The position of the idle slot in principle should be in the frame center, but it may be deviated forward or backward.

In such short idle slot, by properly determining the compressed mode frame of first half and second half and position of the idle slot, the same acquisition time as in the case of frequency handover between GSM and GSM may be obtained.

In the first embodiment, the compressed mode frame is divided into first portion and second portion bounded by the idle slot within one frame. The following is to explain how to insert the observation period, that is, the idle slot in which frame in one UMTS superframe, and how to determine the inserting position.

One UMTS superframe is composed of 12 frames. In the GSM, one GSM superframe is composed of 26 frames, and one frame is 8 BP long, and hence the total period is 208 BP. The idle slot equivalent to 8 BP is observed in two compressed mode operation, and hence one observation in compressed mode has an idle slot length equivalent to 4 BP. Thus, when a first frame is specified arbitrarily in one UMTS superframe, the equation between the position of the second frame and the first frame is as shown in equation (1). In the case shown in equation (1), it is assumed that the frame number of the first portion is even, and the frame number in the second portion is odd. This equation (1) is $$4(2n+1)=K(208 \text{ BP})/12 \quad 2n+1=13K/3. \quad (1)$$

In equation (1), the position that can be observed in the compressed mode of the first half is the same, but since the observation period is 4 BP, half of 8 BP, and hence the equation shows the relation for observing the portion of 4 BP that can be observed in the compressed mode in the second half, equivalently to 4 BP corresponding to the second half of 8 BP missing in the first half. That is, 4(2n+1) denotes an odd-number multiple of 4 BP (when the first half is even, the second half is odd), and it suggests that the interval may be K times the UMTS frame length. When the UMTS frame length is expressed by BP, it is 208 BP (number of BP of UMTS superframe)/12 (number of UMTS frames included in UMTS superframe). Here, n is an arbitrary natural number.

When combinations of K and n that satisfy equation (1) two kinds of combination can be obtained as shown in equation (2). That is, $$(K,n)=(3,6)/(9,19) \quad (2)$$

According to equation (2), the frame three frames after the first frame may be defined as the second frame, or the frame nine frames after the first frame may be defined as the second frame. In FIG. 7, for example, supposing frame #2 to be the first frame, frame #5 is the second frame.

Figure 9:
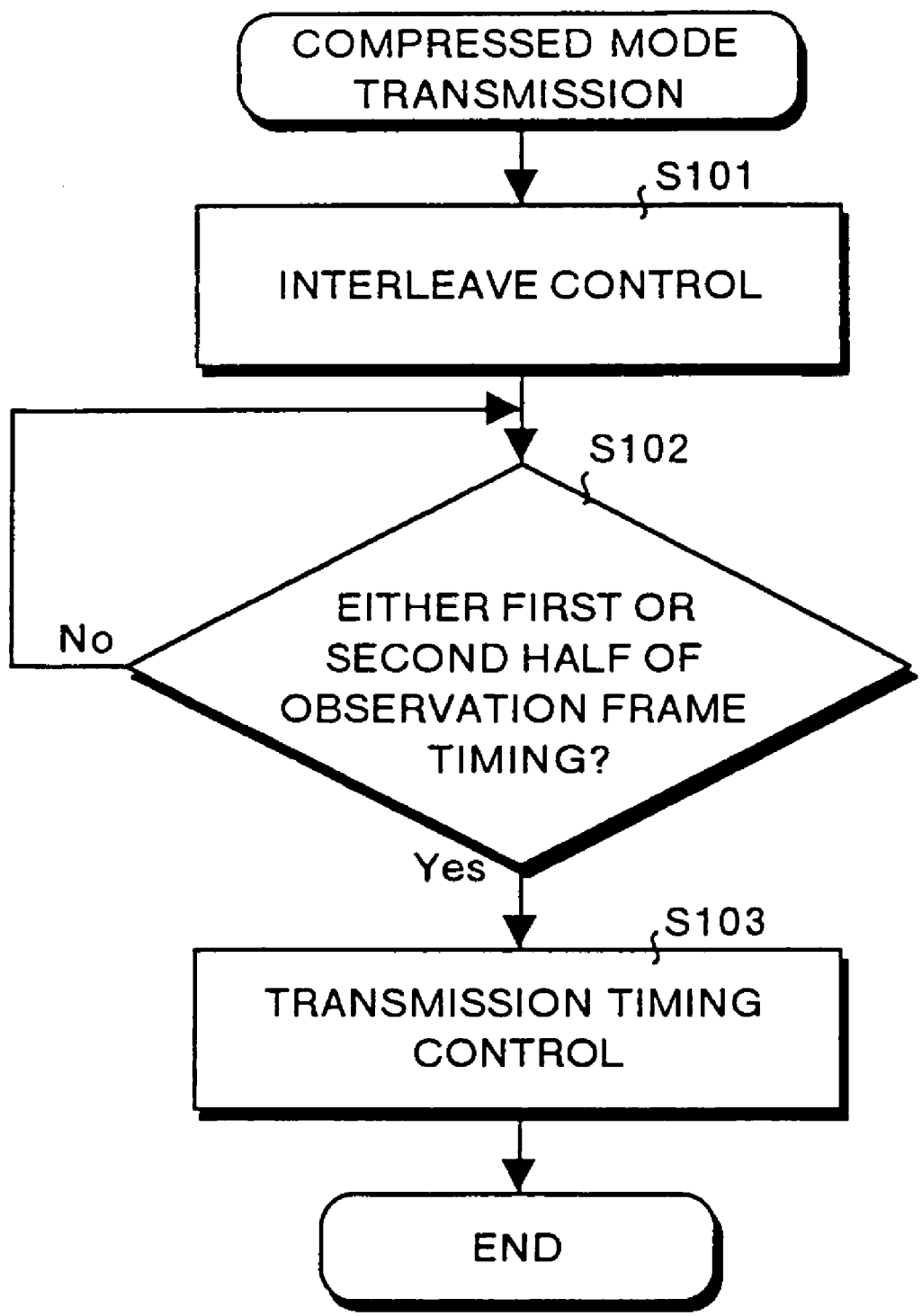
FIG. 9 is a flowchart for explaining the transmission operation in compressed mode according to the first embodiment of the invention.
Figure 10:
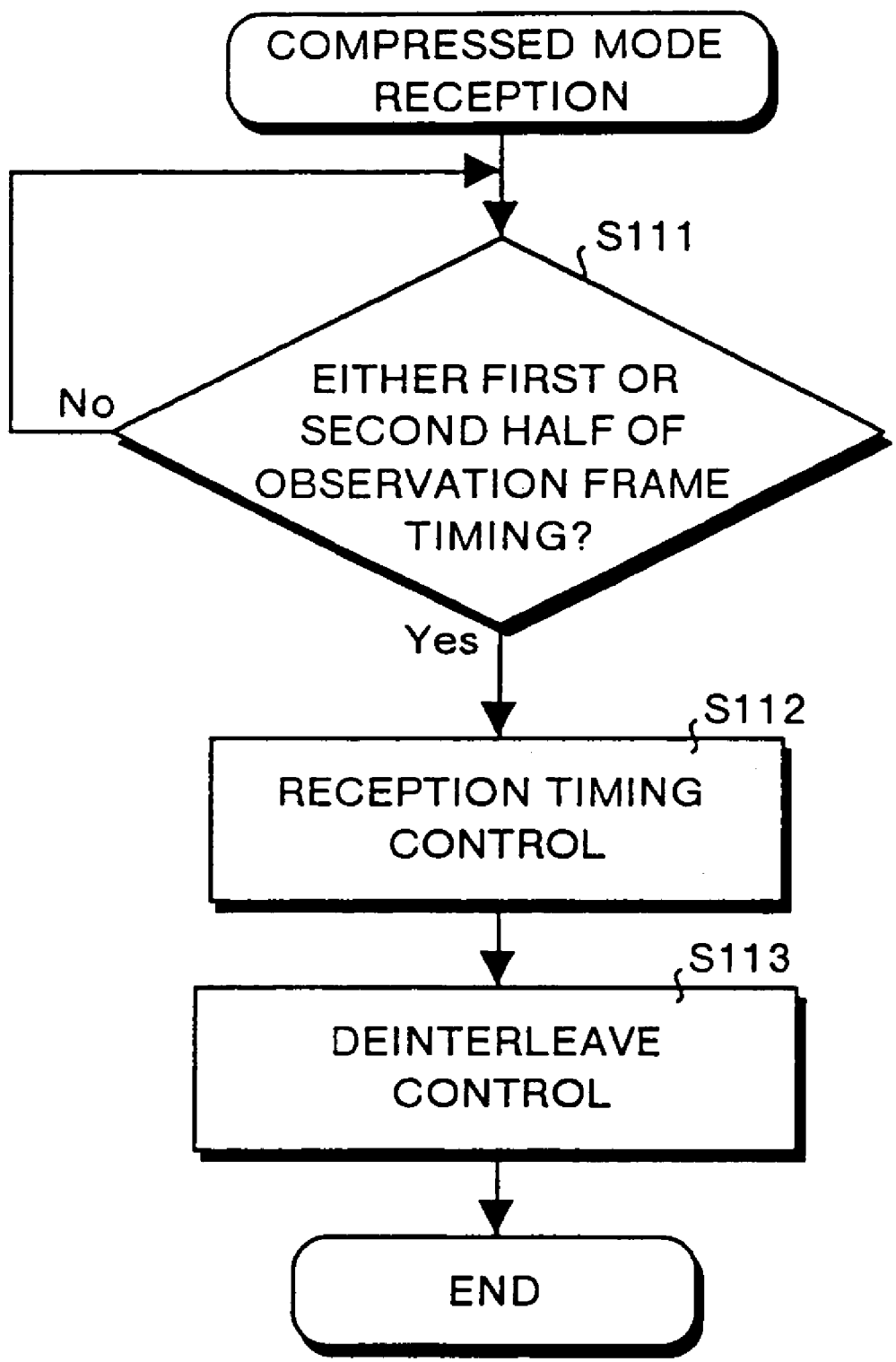
FIG. 10 is a flowchart for explaining the reception operation in compressed mode according to the first embodiment of the invention.
Figure 13:
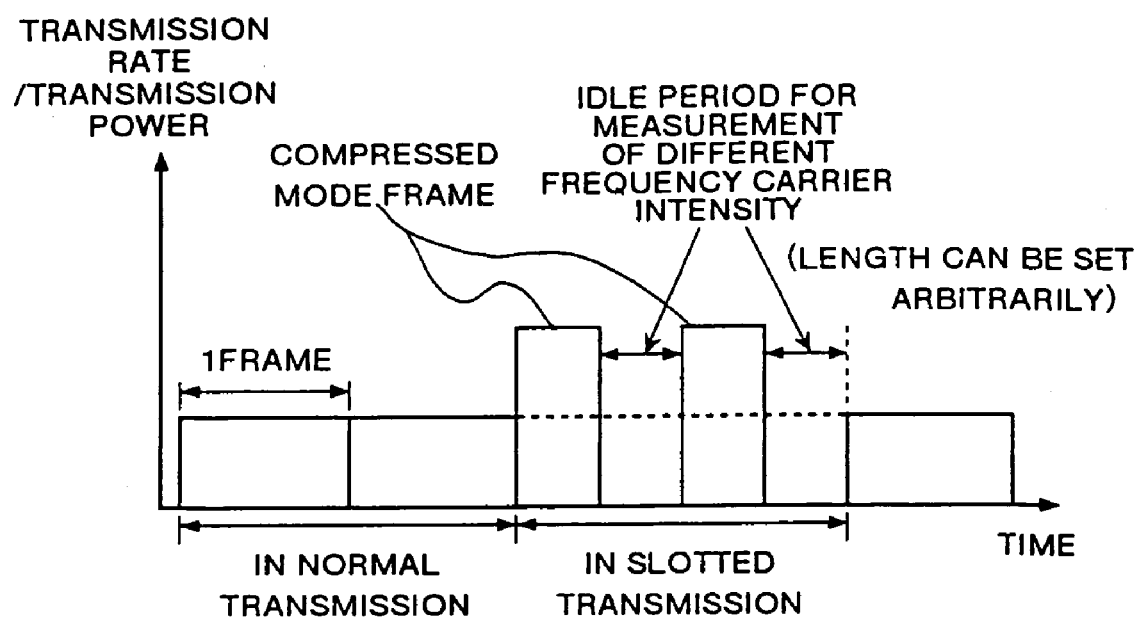
FIG. 13 is a diagram for explaining the frame transmission of downlink in a prior art.

The compressed mode operation when observing and detecting from the UMTS to the GSM system is explained below. Herein, only the compressed mode is described. FIG. 9 is a flowchart for explaining the transmission operation in the compressed mode, and FIG. 10 is a flowchart for explaining the reception operation in the compressed mode. In the compressed mode of the transmitter 1 at the UMTS side (see FIG. 9), interleaving in one frame is instructed to the interleaver 13 (step S101), and the interleaver 13 interleaves in one frame. When the time reaches the timing of either first half or second half of the first frame timing or second frame timing to be observed (step S102), the transmission timing is instructed to the framing/spreading unit 14 (step S103).

Further, increase of average transmission power is instructed to the radio frequency transmitter 15 (step S103), and the frames are transmitted at a higher power in the compressed mode than in the normal mode. Thus, the frequency is observed and detected twice in one UMTS superframe. In this compressed mode, the frames are transmitted intermittently (discontinuously).

On the other hand, in the compressed mode of the receiver 2 at the UMTS side (see FIG. 10), when the time reaches the timing of either first portion or second portion of the first frame timing or second frame timing to be observed (step S111), the reception timing is instructed to the deframing/de-spreading unit 24 (step S112). After receiving the signal of the portion of one frame, deinterleaving by one frame is instructed to the deinterleaver 23 (step S113), and the deinterleaver 23 deinterleaves is one frame. Thus, in the compressed mode, the frames are received intermittently (discontinuously), and the signal of the GSM system is observed in an idle period.

As explained herein, according to the first embodiment, where the UMTS and another system coexist, an idle period for observing the frequency component of the another system is inserted in the superframe of the UMTS. This idle period is at most half of one frame of the superframe of UMTS and is inserted at an interval of certain frames. Hence it is not required to observe the frequency component by one observation in one superframe, and the restrictions in frame transmission such as error correction code and spreading factor can be satisfied. As a result, even when the UMTS and an another system coexist, the frequency component of the another system can be securely observed from the UMTS, and deterioration of interleaving performance of the compressed mode frame can be suppressed at this time.

Moreover, in one UMTS superframe, since the interval of the specified number of frames is determined by the difference in the transmission period between the UMTS and another system, different frequency components can be observed completely depending on the difference in the transmission period.

Since the idle slot time is placed in the center of the frame that is the unit of superframe of UMTS, the interleaving effect can be obtained securely.

In the superframe of UMTS, since plural idle periods are disposed separately in each frame, a necessary idle duration can be held in one superframe.

The total of plural idle slot durations is set at about 6.9 ms equal to the case of GSM, so that the equal idle duration for the observation period of different frequencies of other systems can be held in one UMTS superframe.

The frame in which the idle slot duration is inserted is compressed and transmitted intermittently, and therefore even when idle period is inserted in the duration of one frame, frame transmission of high decodability can be realized.

Since the compressed frame is generated by increasing the coding rate the compression ratio is reduced, and the number of use of spreading codes of shorter code length can be suppressed.

In the compressed mode, moreover, frames compressed at the same spreading factor as in normal mode are generated, and therefore the interference and noise resistant characteristic to the compressed frames can be assured.

Since the average transmission power is increased when transmitting compressed mode frames, the characteristic deterioration can be suppressed to a minimum limit.

In the foregoing first embodiment, at the time of frequency handover, the observation period (about 6.9 ms) is divided into two portions in one UMTS superframe for observing and detecting frequency. However, the invention is not limited to this embodiment alone. As a second embodiment explained below, the observation period may be divided in more than two portions. In the second embodiment, for example, the observation period is divided into four portions. The entire constitution in the second embodiment is same as in the first embodiment, and only the difference in operation is described below.

The observation and detection method of the second embodiment is explained below. FIG. 11 is a diagram for explaining the frame transmission of downlink according to the embodiment of the invention. In FIG. 11, the axis of ordinates denotes the transmission rate or transmission power, and the axis of abscissas represents the time. In comparison between one FCCH/SCH superframe and two UMTS superframes in the common control channel, there is a difference of one frame. In the dedicated traffic channel TACH/F, the position of observation period assigned in one GSM superframe is fixed. Similarly in the UMTS, the positions of four observation periods assigned in one UMTS superframe in the downlink traffic channel are fixed. Therefore, the frequency is observed and detected in specified frames (four positions) of every UMTS superframe. Thus, since there is a difference of one frame between one FCCH/SCH superframe and two UMTS superframes, one frame is shifted each in each observation.

Since one FCCH/SCH superframe corresponds to two periods of UMTS superframe, the frequency is observed and detected eight times in one FCCH/SCH superframe. That is, in every UMTS superframe, the difference in the pair of observation periods corresponds to one UMTS superframe, and the pair of observations progress in a form shifted by one period of one UMTS superframe. Therefore, in frequency handover between UMTS and GSM, the frequency is observed and detected eight times in every FCCH/SCH superframe, and while shifting by one frame each in every period of observation.

In the second embodiment, same as in embodiment 1, the compressed mode frame is divided into first portion and second portion bounded by the idle slot within one frame. The following is to explain how to insert the observation period, that is, the idle slot in which frame of one UMTS superframe, and how to determine the inserting position.

In the foregoing first embodiment, since one UMTS superframe is composed of 12 frames, the method of dividing the UMTS superframe by unit of a frame is employed. However, the UMTS superframe can be divided into a shorter time unit and a position for assigning the idle slot can be set. For example, since one frame in UMTS is composed of 16 slots, the UMTS superframe is divided by unit of a slot in the second embodiment.

The case of four divisions is shown in equation (3). It requires first frame to fourth frame for assigning the each observation period in this case. Equation (3) shows a case in which the frame number of the first frame is even. Equation (3) is an equation for determining the second frame. In the same concept as in the first embodiment, this equation (3) is expressed as $$2(4n+1)=K1(208\ BP)/12\times16\ \ 4n+1=13K1/24. \tag{3}$$

In equation (3), K1 shows the frame number of the second frame of UMTS superframe, and n is an arbitrary natural number. At the right side of equation (3), since one frame is composed of 16 slots, it is multiplied by 12 frames in the denominator.

When combinations of K1 and n that satisfy equation (3) are calculated, two types of combination can be obtained as shown in equation (4). That is, $$(K1,n)=(24,3)/(120,16). \tag{4}$$

In this case, since K1=24 indicates the number of slots, the second frame can be determined by dividing K1 by 16. In the case of K1=24, the solution is 1.5 frames, and when expressed by the frame number, the frame in which the second observation period is assigned is the frame 1.5 frames after the first frame.

Equation (5) is for determining the third frame. This equation (5) is $$2(4n+2)=K2(208 \text{ BP})/12 \times 16 \ 2n+1=13K2/48. \quad (5)$$

In equation (5), K2 denotes the frame number of the third frame of UMTS superframe, and n is an arbitrary natural number.

When combinations of K2 and n that satisfy equation (5) are calculated, two types of combination are obtained as shown in equation (6). That is, $$(K2, n)=(48, 6)/(144, 19). \quad (6)$$

In this case, since K=48 indicates the number of slots, the third frame can be determined by dividing K by 16. In the case of K=48, the solution is 3 frames, and when expressed by the frame number, the frame in which the third observation period is assigned is the frame 3 frames after the first frame.

Equation (7) is for determining the fourth frame. This equation (7) is $$2(4n+3)=K3(208 \text{ BP})/12 \times 16 \ 2n+1=13K3/48. \quad (7)$$

In equation (7), K3 denotes the frame number of the fourth frame of UMTS superframe, and n is an arbitrary natural number.

When combinations of K3 and n that satisfy equation are calculated (7), two types of combination are obtained as shown in equation (8). That is, $$(K3,n)=(72,9)/(168,22). \quad (8)$$

In this case, since K=72 indicates the number of slots, the fourth frame can be determined by dividing K by 16. In the case of K=72, the solution is 4.5 frames, and when expressed by the frame number, the frame in which the fourth observation period is assigned is the frame 4.5 frames after the first frame.

As explained herein, the number of divisions of observation period in one UMTS superframe can be four, and the same effects as in the first embodiment are also obtained in this case. However, unlike the first embodiment, the division interval is not the specified number of frames interval, but is an interval of a specified number of slots.

In the foregoing second embodiment, at the time of frequency handover, the observation period (about 6.9 ms) is divided into four portions in one UMTS superframe for observing and detecting frequency in four frames, but the invention is not limited to this embodiment alone. However, as a third embodiment explained below, the observation period can be divided in more than four portions. In the third embodiment, for example, it is divided into eight portions. The entire constitution in the third embodiment is same as in the first embodiment described above, and only the difference in operation is described below.

The observation and detection method of the third embodiment is explained below. FIG. 12 is a diagram for explaining the frame transmission of downlink in the third embodiment of the invention. In FIG. 12, the axis of ordinates denotes the transmission rate or transmission power, and the axis of abscissas represents the time. As mentioned above, in comparison between one FCCH/SCH superframe and two UMTS superframes in the common control channel, there is a difference of one frame. In the dedicated traffic channel TACH/F the position of observation period assigned in one GSM superframe is fixed. Similarly, in the UMTS, the positions of eight observation periods assigned in one UMTS superframe in the downlink traffic channel are fixed. Therefore, the frequency is observed and detected in specified frames (four positions) of every UMTS superframe. Thus, since there is a difference of one frame between one FCCH/SCH superframe and two UMTS superframes, one frame is shifted each in each observation.

Since one FCCH/SCH superframe corresponds to two periods of UMTS superframe, the frequency is observed and detected 16 times in one FCCH/SCH superframe. That is, in every UMTS superframe, the difference in the set of observation periods corresponds to one UMTS superframe, and the set of observations progress in a form shifted by one period of one UMTS superframe. Therefore, in frequency handover between UMTS and GSM, the frequency is observed and detected 16 times in every period of FCCH/SCH superframe, while shifting by one frame each in every period of observation.

In the third embodiment, too, same as in the foregoing first and second embodiments, the compressed mode frame is divided into first portion and second portion bounded by the idle slot within one frame. The following is to explain how to insert the observation period, that is, the idle slot in which frame in one UMTS superframe, and how to determine the inserting position.

In the third embodiment, same as in the foregoing second embodiment, the UMTS superframe is divided by the shorter time unit, and the position for placing the idle slot is set.

Thus, in the third embodiment, the number of divisions of observation period in one UMTS superframe can be eight, and the same effects as in the first embodiment are also obtained in this case. However, unlike the first embodiment, the division interval is not the specified number of frames interval, but is an interval of a specified number of slots.

In the foregoing first to third embodiments, the observation period is divided up to eight divisions, but the invention is not limited to these examples only. The number of divisions may be further increased as required on the basis of the smaller unit than the slot.

The invention is thus described while referring to preferred embodiments, but the invention may be modified in various forms within the claimed scope, and such changes shall not be excluded from the scope of the invention.

As described herein, according to the mobile radio communication system in one aspect of the invention, in the case where the first communication system and second communication system coexist, since the idle period for observing the frequency component of the second communication system is inserted at most in ½ time of one frame duration for composing one superframe of first communication system, at intervals of a specified number of frames, it is not required to observe the frequency component by one observation in one superframe, and the restrictions in frame transmission such as error correction code and spreading factor can be satisfied. Therefore, even when the first communication system and second communication system coexist, the frequency component of the second communication system can be securely observed from the first communication system. Further, deterioration of interleaving performance of the compressed mode frame during such observation can be suppressed.

According to the mobile radio communication in another aspect of the invention, in the case where the UMTS and another system coexist, since the idle period for observing the frequency component of the another system is inserted at most in ½ time of one frame duration for composing one superframe of UMTS, at intervals of a specified number of frames, it is not required to observe the frequency component by one observation in one superframe, and the restrictions in frame transmission such as error correction code and spreading factor can be satisfied, and therefore even when the UMTS and another system coexist, the frequency component of the another system can be securely observed from the UMTS, and deterioration of interleaving performance of the compressed mode frame can be suppressed at this time.

According to the mobile radio communication apparatus in another aspect of the invention, since the interval of a specified number of frames is determined by the difference in the transmission period between the UMTS and another system, the different frequency components can be observed completely depending on the difference in the transmission period.

According to the mobile radio communication apparatus in another aspect of the invention, since the idle period is placed in the center of the frame that is the unit of superframe of the UMTS, the interleaving effect is obtained securely.

According to the mobile radio communication apparatus in a different aspect of the invention, in the case where the first communication system and second communication system coexist, since the idle period for observing the frequency component of the second communication system is inserted at most in ½ time of one frame duration for composing one superframe of first communication system, at intervals of a specified number of slots, it is not required to observe the frequency component by one observation in one superframe, and the restrictions in frame transmission such as error correction code and spreading factor can be satisfied. Therefore even when the first communication system and second communication system coexist, the frequency component of the second communication system can be securely observed from the first communication system. Further, deterioration of interleaving performance of the compressed mode frame during such observation can be suppressed.

According to mobile radio communication apparatus in another aspect of the invention, in the case where the UMTS and another system coexist, since the idle period for observing the frequency component of the another system is inserted at most in ½ time of one frame duration for composing one superframe of UMTS, at intervals of a specified number of slots, it is not required to observe the frequency component by one observation in one superframe, and the restrictions in frame transmission such as error correction code and spreading factor can be satisfied, and therefore even when the UMTS and another system coexist, the frequency component of the another system can be securely observed from the UMTS, and deterioration of interleaving performance of the compressed mode frame can be suppressed at this time.

According to the mobile radio communication system in another aspect of the invention, since the interval of a specified number of slots is determined by the difference in the transmission period between the UMTS and another system, the different frequency components can be observed completely depending on the difference in the transmission period.

According to the mobile radio communication system in another aspect of the invention, since the plural idle periods in the superframe of the UMTS are placed separately in each frame, the necessary idle duration is held in one superframe.

According to the mobile radio communication system in another aspect of the invention, since the total of the plural idle periods is equal to the specified idle duration provided for observing the frequency component between the other systems, an idle period equal to the observation of different frequencies of other systems can be held in one superframe.

According to the mobile radio communication system in another aspect of the invention, since the frame in which the specified time is inserted is compressed and transmitted intermittently, a frame transmission of a high decodability is realized even when an idle period is inserted in one frame period.

According to the mobile radio communication system in another aspect of the invention, since the compressed frame is generated by increasing the coding rate, the compression rate is lowered, and the number of spreading codes of a shorter code length can be suppressed.

According to the mobile radio communication system in another aspect of the invention, since the compressed frame is generated at a same spreading factor as another frame in which the specified idle duration is not inserted, the interference and noise resistant characteristic to the compressed frame is assured.

According to the communication apparatus applied in a mobile radio communication system according to another aspect of the invention, in the case where the first communication system and second communication system coexist, since it is controlled so that the idle period for observing the frequency component of the second communication system is inserted at most in ½ time of one frame duration for composing superframe in the superframe of the first communication system, it is not required to observe the frequency component by one observation in one superframe, and the restrictions in frame transmission such as error correction code and spreading factor can be satisfied. Therefore, even when the first communication system and second communication system coexist, the frequency component of the second communication system can be securely observed from the first communication system. Further, deterioration of interleaving performance of the compressed mode frame during such observation can be suppressed.

According to the communication apparatus applied in a mobile radio communication system according to another aspect of the invention, in the case where the UMTS and another system coexist, since the idle period for observing the frequency component of the another system is inserted at most in ½ time of one frame duration for composing one superframe of UMTS, at intervals of a specified number of frames, it is not required to observe the frequency component by one observation in one superframe, and the restrictions in frame transmission such as error correction code and spreading factor can be satisfied. Therefore, even when the UMTS and another system coexist, the frequency component of the another system can be securely observed from the UMTS. Further, deterioration of interleaving performance of the compressed mode frame during such observation can be suppressed.

According to the communication apparatus applied in a mobile radio communication system according to another aspect of the invention, since the interval of a specified number of frames is determined by the difference in the transmission period between the UMTS and another system at the time of controlling, the different frequency components can be observed completely depending on the difference in the transmission period.

According to the communication apparatus applied in a mobile radio communication system according to another aspect of the invention, since the specified idle period is placed in the center of the frame which is the unit of superframe of the UMTS at the time of controlling, the interleaving effect may be obtained securely.

According to the communication apparatus applied in a mobile radio communication system according to another aspect of the invention, in the case where the first communication system and second communication system coexist, since it is controlled so that the idle period for observing the frequency component of the second communication system is inserted at most in ½ time of one frame duration for composing superframe in the superframe of the first communication system and at an interval of a specified number of slots, it is not required to observe the frequency component by one observation in one superframe, and the restrictions in frame transmission such as error correction code and spreading factor can be satisfied. Therefore even when the first communication system and second communication system coexist, the frequency component of the second communication system can be securely observed from the first communication system. Further, deterioration of interleaving performance of the compressed mode frame during such observation can be suppressed.

According to the communication apparatus applied in a mobile radio communication system according to another aspect of the invention, in the case where the UMTS and another system coexist, since the idle period for observing the frequency component of the another system is inserted at most in ½ time of one frame duration for composing one superframe of first communication system, at intervals of a specified number of frames of UMTS, at intervals of a specified number of slots, it is not required to observe the frequency component by one observation in one superframe, and the restrictions in frame transmission such as error correction code and spreading factor can be satisfied. Therefore, even when the UMTS and another system coexist, the frequency component of the another system can be securely observed from the UMTS. Further, deterioration of interleaving performance of the compressed mode frame during such observation can be suppressed.

According to the communication apparatus applied in a mobile radio communication system according to another aspect of the invention, since the interval of a specified number of slots is determined by the difference in the transmission period between the UMTS and another system at the time of controlling, different frequency components can be observed completely depending on the difference in the transmission period.

According to the communication apparatus applied in a mobile radio communication system according to another aspect of the invention, since plural idle periods are disposed in separate frames in the superframe of the UMTS at the time of controlling, a necessary idle duration can be held in one superframe.

According to the communication apparatus applied in a mobile radio communication system according to another aspect of the invention, since the total of the plural idle periods is set equal to the specified idle duration provided for observing the frequency component between the other systems at the time of controlling, an idle duration equal to observation of different frequencies between other systems can be held in one superframe.

According to the communication apparatus applied in a mobile radio communication system according to another aspect of the invention, since the compressed frame is generated by increasing the coding rate at the time of controlling, the compression rate is lowered, and the number of spreading codes of a shorter code length can be suppressed.

According to the communication apparatus applied in a mobile radio communication system according to another aspect of the invention, since the compressed frame is generated at a same spreading factor as another frame in which the specified idle duration is not inserted at the time of controlling, the interference and noise resistant characteristic to the compressed frame is assured.

According to the communication apparatus applied in a mobile radio communication system according to another aspect of the invention, since the average transmission power is increased in the compressed mode at the time of controlling, the characteristic deterioration may be suppressed to a minimum limit.

According to the mobile radio communication method according to aspect of the invention, by compressing the frames to be transmitted intermittently at the time of compressed mode, and inserting an idle period for observing the frequency component of the second communication system at most in ½ time of one frame duration for composing the superframe of the first communication system in the superframe of the first communication system and at an interval of a specified number of frames determined by the relation of the frame structure between the first communication system and second communication system, since the step for transmitting intermittently the compressed frames is set up, it is not required to observe the frequency component by one observation in one superframe, and the restrictions in frame transmission such as error correction code and spreading factor can be satisfied. Therefore, even when the first communication system and second communication system coexist, the frequency component of the second communication system can be securely observed from the first communication system. Further, deterioration of interleaving performance of the compressed mode frame during such observation can be suppressed.

According to the mobile radio communication method according to another aspect of the invention, by compressing the frames to be transmitted intermittently at the time of compressed mode, and inserting an idle period for observing the frequency component of the second communication system at most in ½ time of one frame duration for composing the superframe of the first communication system in the superframe of the first communication system and at an interval of a specified number of slots determined by the relation of the frame structure between the first communication system and second communication system, since the step for transmitting intermittently the compressed frames is set up, it is not required to observe the frequency component by one observation in one superframe, and the restrictions in frame transmission such as error correction code and spreading factor can be satisfied. Therefore, even when the first communication system and second communication system coexist, the frequency component of the second communication system can be securely observed from the first communication system. Further, deterioration of interleaving performance of the compressed mode frame during such observation can be suppressed.

According to the mobile radio communication method according to another aspect of the invention, in particular, in the case where the UMTS and another system coexist, since the idle period for observing the frequency component of the another system is inserted at most in ½ time of one frame duration for composing one superframe of UMTS, at intervals of a specified number of frames or at an interval of a specified number of slots, it is not required to observe the frequency component by one observation in one superframe, and the restrictions in frame transmission such as error correction code and spreading factor can be satisfied. Therefore, even when the UMTS and another system coexist, the frequency component of the another system can be securely observed from the UMTS. Further, deterioration of interleaving performance of the compressed mode frame during such observation can be suppressed.

According to the mobile radio communication method according to another aspect of the invention, since the compressed frame is generated by increasing the coding rate at this step, the compression ratio is lowered, and the number of spreading codes of a shorter code length can be suppressed.

According to the mobile radio communication method according to another aspect of the invention, since the compressed frame is generated at a same spreading factor as another frame in which the specified idle period is not inserted at this step, the interference and noise resistant characteristic to the compressed frame is assured.

According to the mobile radio communication method according to another aspect of the invention, since the average transmission power is increased in the compressed mode at this step, the characteristic deterioration may be suppressed to a minimum limit.

INDUSTRIAL APPLICABILITY

As described herein, the mobile radio communication system, the communication apparatus applied in the mobile radio communication system, and the mobile radio communication method of the invention are useful for observing the control channel of another system by making use of idle period in the mobile radio communication system. In particular this invention can suitably used in the mobile radio communication system in which the UMTS (Universal Mobile Terrestrial communication System) and GSM (Group Specific Mobile) system coexist.

What is claimed:

1. A mobile radio communication method for a receiver in a mobile radio communication system employing a CDMA (Code Division Multiple Access) method, the mobile radio communication system including
a transmitter which uses a period necessary for transmission of a specified number of frames, as a first transmission period, and interleaves data in said frames in bit unit in a normal mode, and successively transmits said frames in a unit of said first transmission period, and
said receiver which receives the frames transmitted by said transmitter, the mobile radio communication method comprising:
a step of receiving a plurality of frames in said first transmission period, in which non-transmission periods of ½ or less of the frame length are generated, by setting up said plurality of frames in compressed mode, in which the frames are compressed and disposed fixedly and not successively in said first transmission period, wherein each of the compressed frames is divided, and the divided compressed frame is assigned to the head and the end of the frame timing and data in the frame is interleaved in bit unit, and
a step of monitoring a frequency component of a control data transmission channel having a second transmission period which is used in a mobile radio communication system which is different from said mobile radio communication system, in each of respective non-transmission periods which is generated in each of said plurality of frames, the second transmission period being not integer multiple of said first transmission period.

* * * * *